(12) United States Patent
Stupakov et al.

(10) Patent No.: US 11,515,995 B2
(45) Date of Patent: Nov. 29, 2022

(54) EFFICIENT COMPUTATION OF UNIVARIATE STATISTICAL MOMENTS FOR SIDE CHANNEL VULNERABILITY EVALUATION

(71) Applicant: Cryptography Research, Inc., Sunnyvale, CA (US)

(72) Inventors: Ilya Stupakov, Novosibirsk (RU); Anton Kochepasov, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 538 days.

(21) Appl. No.: 16/704,782

(22) Filed: Dec. 5, 2019

(65) Prior Publication Data

US 2020/0195416 A1 Jun. 18, 2020

Related U.S. Application Data

(60) Provisional application No. 62/779,009, filed on Dec. 13, 2018.

(51) Int. Cl.
*H04L 9/00* (2022.01)
*G06K 9/62* (2022.01)
(Continued)

(52) U.S. Cl.
CPC .............. *H04L 9/003* (2013.01); *G06F 17/16* (2013.01); *G06F 17/18* (2013.01); *G06K 9/6267* (2013.01)

(58) Field of Classification Search
CPC ......... H04L 9/003; G06F 17/16; G06F 17/18; G06K 9/6267
See application file for complete search history.

(56) References Cited

U.S. PATENT DOCUMENTS 10,628,755 B1 * 4/2020 Wang ..................... G06N 7/005
2020/0065675 A1 * 2/2020 Sundaram .............. G16B 20/00
(Continued)

OTHER PUBLICATIONS

B.P Welford,"Note on a Method for Calculating Corrected Sums of Squares and Products", Technometrics, vol. 4, No. 3 (Aug. 1962), pp. 419-420 Published by: American Statistical Association and American Society for Quality Stable URL: http://www.jstor.org/stable/1266577 Accessed: Mar. 17, 2010 12:50.
(Continued)

*Primary Examiner* — Dac V Ha
(74) *Attorney, Agent, or Firm* — Lowenstein Sandler LLP

(57) ABSTRACT

Systems and methods for efficient computation of univariate statistical moments. An example method comprises: receiving a plurality of input traces, wherein each trace of the plurality of input traces includes a plurality of sample points; appending, to a trace matrix comprising combinations of pre-determined degrees of the sample points, a plurality of rows representing the plurality of input traces; appending, to a classifier matrix, a plurality of columns representing metadata associated with the plurality of input traces; applying a defined transformation to the classifier matrix to produce a transformed classifier matrix; incrementing an accumulator matrix by a product of the transformed classifier matrix and the trace matrix; computing, using a first subset of elements of the accumulator matrix, a first statistical moment for a first portion of the input traces identified by a first subset of elements of the classifier matrix, wherein the first subset of elements of the classifier matrix is identified by a first classifier value; and computing, by subtracting each element of the first subset of elements of the accumulator matrix from a corresponding sum of elements of the input traces stored by the accumulator matrix, a second statistical moment for a second portion of the input traces identified by a second subset of elements of the
(Continued)

classifier matrix, wherein the second subset of elements of the classifier matrix is identified by a second classifier value.

25 Claims, 4 Drawing Sheets

(51) Int. Cl.
*G06F 17/16* (2006.01)
*G06F 17/18* (2006.01)

(56) References Cited

U.S. PATENT DOCUMENTS

2020/0151289 A1* 5/2020 Sikka .................... G06N 3/0418
2020/0225112 A1* 7/2020 Qiu ...................... G01M 5/0033

OTHER PUBLICATIONS

Myoungkeum Choi, "E±cient Calculation of Statistical Moments for Structural Health Monitoring", Journal of Structural Health Monitoring Jan. 1, 2010 vol. 9, No. 1 13-14.

Oscar Reparaz et al. "Fast Leakage Assessment", imec-COSIC KU Leuven Dept. Electrical Engineering Kasteelpark Arenberg 10, B-3001 Leuven-Heverlee, Belgium firstname.lastname@esat.kuleuven.be.

Philippe Pebay, "Formulas for Robust, One-Pass Parallel Computation of Covariances and Arbitrary-Order Statistical Moments", SAND2008-6212 printed Sep. 2008.

Phillippe Pebay et al. ,"Numerically stable, scalable formulas for parallel and online computation of higher-order multivariate central moments with arbitrary weights", Accepted: Dec. 9, 2015/Published online: Mar. 29, 2016 © Springer-Verlag Berlin Heidelberg (outside the USA) 2016.

Tobias Schneider et al. "Leakage Assessment Methodology", Horst G ortz Institute for IT-Security, Ruhr-Universit at Bochum, Germany ftobias.schneider-a7a, amir.moradig@rub.de.

Tony F. Chan ,"Updating Formulae and a Pairwise Algorithm for Computing Sample Variances", Stan CS 79 773, Nov. 1979 Department of computer science school of humanities and sciences Stanford University.

* cited by examiner

EFFICIENT COMPUTATION OF UNIVARIATE STATISTICAL MOMENTS FOR SIDE CHANNEL VULNERABILITY EVALUATION

RELATED APPLICATIONS

This application claims the priority benefit of U.S. Provisional Application No. 62/779,009 filed Dec. 13, 2018, which is incorporated herein by reference in its entirety.

TECHNICAL FIELD

The present disclosure is generally related to computer systems, and is more specifically related to cryptographic data processing systems and computational methods.

BACKGROUND

Statistical moment is a specific quantitative measure characterizing a set of sample points representing a probability distribution function. The first moment is the mean (expected value), the second central moment is the variance, the third central moment is the skewness, and the fourth central moment (with normalization and shift) is the kurtosis of the probability distribution. While higher statistical moments (fifth, sixth, etc.) may be utilized, they do not have particular names.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
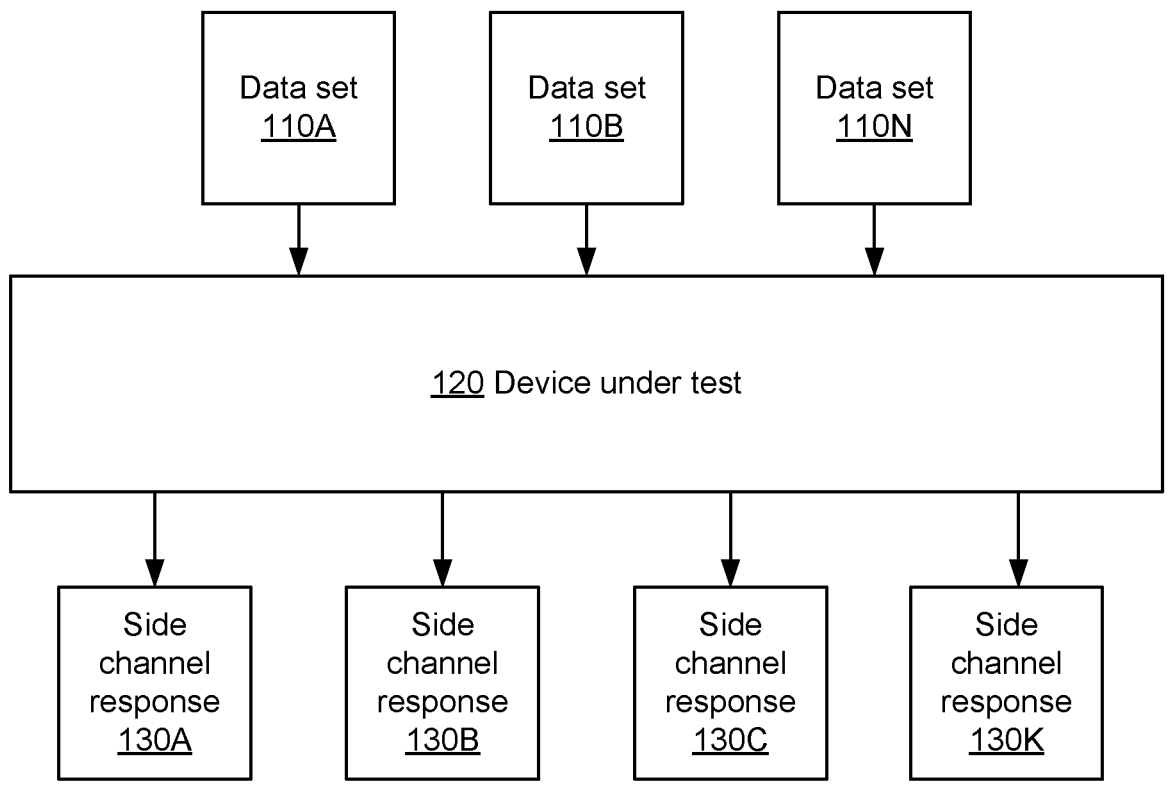
FIG. 1 schematically illustrates an example method of evaluating side channel attack vulnerability of a cryptographic data processing device, in accordance with one or more aspects of the present disclosure.

Described herein are systems and methods for efficient computation of univariate statistical moments, which may be utilized for performing various data analysis tasks. In particular, the computational methods described herein may be utilized for the side channel analysis, such as differential power analysis (DPA) or correlation power analysis (CPA) of cryptographic data processing devices. "Cryptographic data processing device" herein shall refer to a data processing device (e.g., a general purpose or specialized processor, a system-on-chip, a cryptographic hardware accelerator, or the like) utilized for performing cryptographic data processing operations.

DPA or CPA measures the side channel responses (such as the power consumption, the electromagnetic emission, the sound emission, the heat emission, etc.) by certain circuits of a target cryptographic data processing device in response to varying one or more data inputs of sequential data manipulation operations. Thus, DPA, CPA, and/or various other side channel analysis methods may be employed by malicious third parties in an attempt to exploit interactions of sequential data manipulation operations which are based on certain internal states of the target cryptographic data processing device in order to determine one or more protected data items (e.g., encryption keys), which act as operands of the data manipulation operations.

In order to evaluate a potential side channel attack vulnerability of a cryptographic data processing device, the device may be extensively tested by recording side channel responses to various sequences of data processing operations being performed by the device. The acquired responses may then be analyzed in an attempt to detect correlations between the data being processed and the measured responses. A detected correlation may be indicative of the device potential vulnerability to side channel attacks.

In the quantitative research methodology, determining whether two data samples are correlated or significantly different from each other may involve, e.g., performing Welch's t-test, in which the test statistic t follows a Student's t-distribution. Alternatively, Student's t-test statistics and/or other statistical hypothesis tests may be utilized.

The t-test examines a value indicative of the validity of the null hypothesis, which assumes that the means of two samples are equal (i.e., both samples have been drawn from the same statistical population and therefore are statistically indistinguishable from each other). Student's or Welch's t-test statistic may be computed as follows:

$$t = (\mu_0 - \mu_1)/\sqrt{(s_0^2/m_0 + s_1^2/m_1)}$$

where $\mu_0$ and $\mu_1$ are the sample means of the first and second datasets, respectively, represented by vectors having the same size as the processed waveforms; the vectors may also represent a part of that waveform, e.g. a sub-array, or the vectors may be a concatenation of two or more sub-arrays, $s_0^2$ and $s_1^2$ are variances of the first and second datasets, respectively, and $m_0$ and $m_1$ are the number of sample traces in the first and second datasets, respectively.

In certain implementations, a threshold value of the t-test statistic| (e.g., T=4.5) may be defined to reject the null hypothesis with a chosen confidence level (e.g., the confidence level exceeding 0.99999), such that the value of exceeding the chosen threshold is indicative of the samples being significantly different; otherwise, there may be the samples may be correlated.

Statistical hypothesis testing may require processing of very large numbers of data traces (e.g., ranging from thousands to hundreds of millions of traces). In common implementations, the computational complexity of determining values of means, variances, and/or higher-order statistics may become a critical factor for various practical implementations operating with large datasets. Accordingly, efficiency and numerical stability of computations become of a paramount importance By providing efficient one-pass methods of computation of univariate statistical moments, which may be utilized for performing various data processing tasks, implementations of the present disclosure represent improvements to the functionality of general purpose and/or specialized computer systems. The inventors have shown that the methods described herein compute univariate statistical moments by at least one order of magnitude faster than most common methods. In another aspect, the systems and methods described herein represent improvements to design of cryptographic data processing devices, by enabling efficient testing of such devices for evaluating their side channel attack vulnerability.

The statistical moment computation methods described herein may be utilized for the statistical analysis of the acquired side channel responses of a target cryptographic data processing device. As schematically illustrated by FIG. 1, the device vulnerability evaluation procedure may, consecutively and/or simultaneously, feed one or more input datasets 110A-110N to the device under test 120 while recording the respective side-channel response waveforms 130A-130K (e.g., reflecting the power consumption, the electromagnetic emission, the sound emission, and/or the heat emission) of the device. The digitized waveforms 130 may then be compared to the respective inputs 110 and/or to each other, e.g., by computing Welch's or Student's t-test values or performing other methods of statistical hypothesis testing, which may then be utilized for making the decision on the device under test vulnerability to side channel attacks, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, certain higher-order univariate statistics and computational examples and referenced and described for illustrative purposes only and do not limit the scope of the present disclosure to any particular bus width values.

Methods of the present disclosure may operate on sets of observed values of one or more variables being analyzed, such that each set of observed values includes multiple traces, and each trace in turn includes one or more sample points, or observations (measurements). Given an example dataset of m traces, in which each trace includes n sample points, the first several statistical moments may be computed as follows:

$$\text{Average (the 1st raw moment): } \mu_i = E(x_i) \tag{1}$$

$$\text{Variance (the 2}^{nd}\text{ central moment): } \sigma_i^2 = E((x_i - \mu_i)^2) \tag{2}$$

$$\text{Skewness (normalized form of the 3}^{rd}\text{ central moment): } \gamma_i = E\left(\left(\frac{x_i - \mu_i}{\sigma_i}\right)^3\right), \tag{3}$$

$$\text{Kurtosis (a normalized form of the 4}^{th}\text{ central moment) } \kappa_i = E\left(\left(\frac{x_i - \mu_i}{\sigma_i}\right)^4\right) \tag{4}$$

The higher-order statistical moments, starting from the $5^{th}$ central moment, may similarly be computed using their respective definitions.

Central moments, which may be utilized for t-test computations, may be derived from respective raw moments using the following formula:

$$CM_k = (-1)^k(1-k)M_1^k + \sum_{p=2}^{k}(-1)^{k-p}\binom{k}{p}M_p M_1^{k-p}, \tag{5}$$

where $CM_k$ is the k-th central moment, and $M_k$ is the k-th raw moment.

Variances, which may be utilized for t-test computations, may be derived from the central moments as follows:

$$s_Y^2 = CM_2 *_k - CM_k^2, \text{ for moment 2} \tag{6}$$

$$s_Z^2 = s_Y^2 / CM_2^k, \text{ for moment 3 and higher} \tag{7}$$

Statistical moment computation may be performed iteratively, in parallel with acquiring the traces of samples. As m new traces are added to the input dataset, the previously stored intermediate result (i.e., an accumulator matrix which is initially initialized with zeroes) may be updated with new data (by adding, to the accumulator matrix saved at the previous iteration, a product of the trace matrix and the transformed (e.g., transposed and/or rotated) classifier matrix produced at the current iteration, as described in more detail herein below). The computation cycle may be terminated when no new traces are available or when a terminating condition has been met (e.g., vulnerability of the device under test to side channel attacks is established).

As can be seen from the definitions of the requisite raw moments, computing the raw moments utilizes various combinations of all degrees of the observed sample points, up to and including the degree corresponding to the ordinal number of the highest moment being computed (e.g., the first degree for the mean, the second degree for the variation, the third degree for the skewness, etc.). Accordingly, the input data for computing the requisite raw moments may be represented by a rectangular matrix X containing various combinations of all requisite degrees of the sample points and a corresponding classifier matrix C storing metadata associated with the respective traces. The trace matrix X may be represented as follows:

$$X = \begin{bmatrix} 1 & x_{11} & \cdots & x_{1n} & x_{11}^2 & \cdots & x_{1n}^2 & \cdots & x_{11}^p & \cdots & x_{1n}^p \\ \vdots & \vdots & & \vdots & \ddots & \vdots & \cdots & \vdots & \ddots & \vdots \\ 1 & x_{m1} & \cdots & x_{mn} & x_{m1}^2 & \cdots & x_{mn}^2 & \cdots & x_{m1}^p & \cdots & x_{mn}^p \end{bmatrix} \tag{8}$$

The trace matrix X contains m rows and (n*p+1) columns, where p is the maximum requisite degree corresponding to the ordinal number of the highest statistical moment being computed. Each row of the trace matrix X may be represented by a vector including an element equal to one and also including p sequences of elements, such each sequence includes n elements representing a corresponding degree of all sample points, and the sequences can appear in any order. Similarly, rows of the trace matrix X (representing the respective traces) may appear in any order. Furthermore, in certain implementations, the trace matrix X may contain additional rows and/or columns carrying various auxiliary or other related data, in which case the trace matrix X would contain (m+q) rows and (n*p+r) columns, where q and (r−1) represent the numbers or rows and columns carrying the auxiliary or other related data.

Accordingly, another example of the structure of the trace matrix X may be represented as follows:

$$X = \begin{bmatrix} x_{m1} & \cdots & x_{mn}^p & \cdots & x_{m1} & \cdots & x_{mn} & 1 & x_{m1}^2 & \cdots & x_{mn}^2 \\ \vdots & \ddots & \vdots & \vdots & \vdots & \ddots & \vdots & \vdots & \vdots & \ddots & \vdots \\ x_{11}^p & \cdots & x_{1n}^p & \cdots & x_{11} & \cdots & x_{1n} & 1 & x_{11}^2 & \cdots & x_{1n}^2 \end{bmatrix} \tag{9}$$

The classifier matrix C may contain metadata associated with the respective traces. In an illustrative example, the classifier matrix C may be represented by a binary matrix, in which every row reflects the input data being processed by the device under test, such that processing of the input data produced a corresponding side channel response trace. In another illustrative example, the classifier matrix C may be represented by a binary matrix, in which every row reflects an intermediate state of the device under test, such that processing of the input data produced the intermediate state of the data processing device (e.g., by storing a certain value in a certain register of the data processing device), thus triggering a corresponding side channel response trace. In the statistical moment computations, the transposed classifier matrix C may be utilized, which may be represented as follows:

$$C = \begin{bmatrix} 1 & 1 & 1 \\ c_{11} & \cdots & c_{m1} \\ \vdots & \cdots & \vdots \\ c_{1k} & \cdots & c_{mk} \end{bmatrix} \quad (10)$$

"Transposed matrix" herein refers to a matrix which is produced from the original matrix by reflecting the original matrix over its main diagonal, thus switching the row and column indices of the original matrix.

Thus, the transposed classifier matrix C contains k+1 rows and m columns, where m represents the number of side channel response traces stored in the trace matrix X, and k represents the size of the metadata vector associated with each trace. Each column of the transposed classifier matrix C may be represented by a vector including an element equal to one and further including k metadata elements associated with the corresponding side channel response trace. Accordingly, the order of columns of the transposed classifier matrix C should correspond to the order of rows in the associated trace matrix X.

In certain implementations, the classifier matrix may be further transformed, e.g., by rotating by 90 degrees clockwise or counterclockwise. Accordingly, another example of the structure of the transformed classifier matrix C may be represented as follows:

$$C = \begin{bmatrix} c_{m1} & \cdots & c_{11} \\ \vdots & \cdots & \vdots \\ c_{mk} & \cdots & c_{1k} \\ 1 & 1 & 1 \end{bmatrix} \quad (11)$$

Thus, the input data for computing the requisite raw moments may be represented by a rectangular matrix X containing various combinations of all requisite degrees of the sample points and a corresponding classifier matrix C storing the metadata associated with the respective traces.

The accumulator matrix, which is utilized to hold the intermediate results at every iteration, may contain (k+1) rows and (n*p+1) columns, and may be initialized with zeroes before the first iteration of the method:

$$A = \begin{bmatrix} 0 & \cdots & 0 \\ \vdots & \ddots & \vdots \\ 0 & \cdots & 0 \end{bmatrix} \quad (12)$$

At every iteration of the computation, as m new traces are added to the input dataset, the result of the previous iteration saved in the accumulator matrix A may be updated with new data (by adding, to the accumulator matrix A, a product of the trace matrix X and the transformed (e.g., transposed and/or rotated) classifier matrix C produced at the current iteration):

$$A = A + C*X \quad (13)$$

Alternatively, taking into account that C is the transposed classifier matrix and denoting the original matrix as C':

$$A = A + X'*C' \quad (13')$$

The accumulator matrix A may then be utilized for computing the requisite raw moments as follows:

$$M1_p = E(x_i^p \mid c_k = 1) = \frac{A_{k+1,n*p+i+1}}{A_{k+1,1}}, \quad (14)$$

$$M0_p = E(x_i^p \mid c_k = 0) = \frac{A_{1,n*p+i+1} - A_{k+1,n*p+i+1}}{m - A_{k+1,1}} \quad (15)$$

where the moments $M1_p$ and $M0_p$ represent p-th statistical moments computed based on subset of the input traces corresponding to the classifier values of 1 and 0, respectively, and where elements of the first row of the accumulator matrix ($A_{1,j}$) store the total number of input traces, followed by sums of first degrees of input traces, followed by the sums of second degrees of input traces, etc.

The computed values of $M1_p$ and $M0_p$ may then be utilized for computing the requisite higher-order statistical univariate moments based on their respective definitions. Central moments and variances, which may be utilized for t-test computations, may be derived from respective raw moments using the above-referenced formulas (5)-(7). The computation cycle may be terminated when no new traces are available or when a terminating condition has been met (e.g., vulnerability of the device under test to side channel attacks is established).

Figure 2:
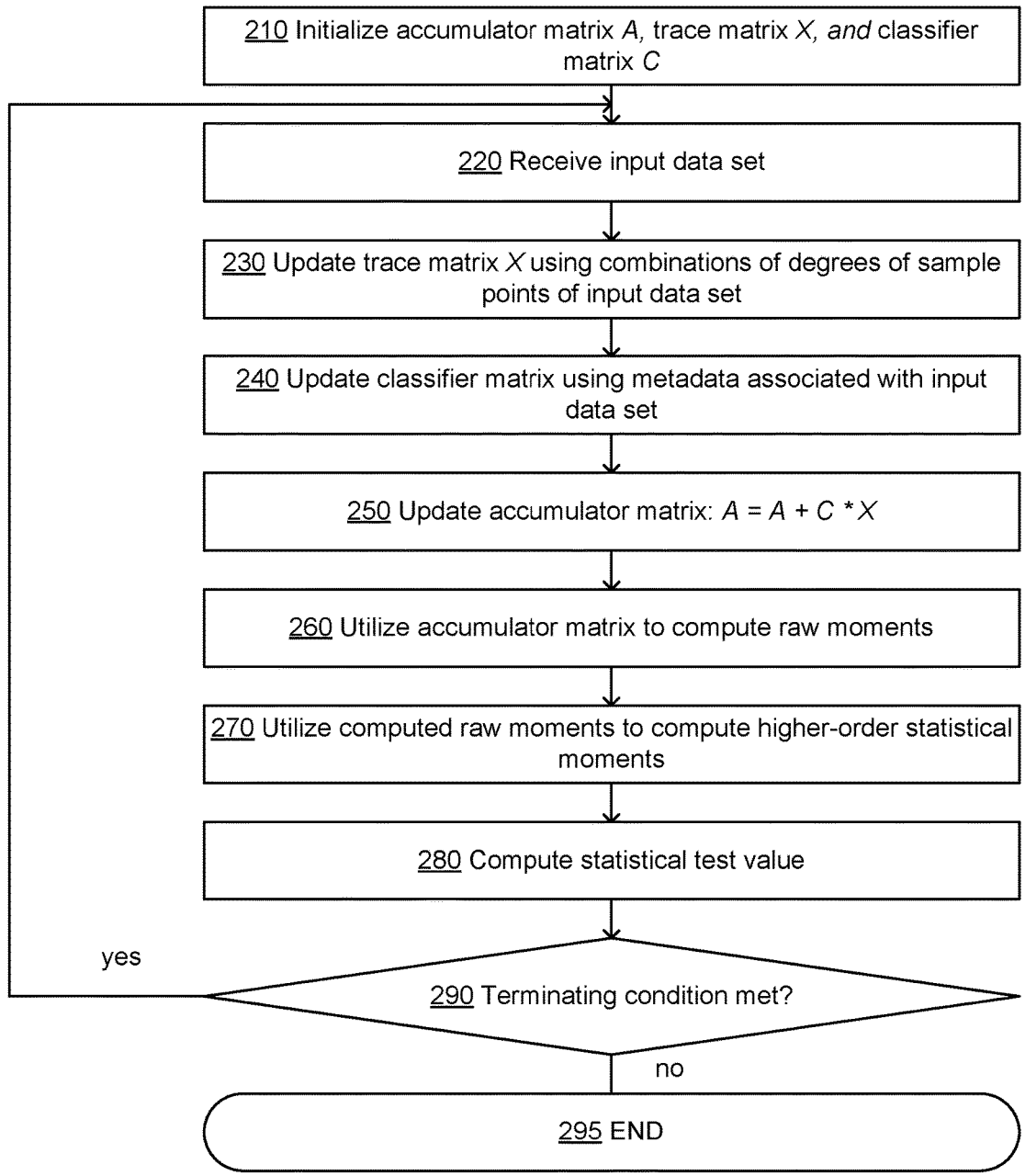
FIG. 2 depicts a flow diagram of an example method of calculating univariate statistical moments, in accordance with one or more aspects of the present disclosure.

FIG. 2 depicts a flow diagram of one illustrative example of method 200 of calculating univariate statistical moments, in accordance with one or more aspects of the present disclosure. Method 200 and/or each of its individual functions, routines, subroutines, or operations may be performed by one or more general purpose or specialized processing devices of a computer system (e.g., example computer system 1000 of FIG. 4). In certain implementations, method 200 may at least partially be performed by specialized hardware accelerator circuitry implementing one or more operations of method 200.

In certain implementations, method 200 may be performed by a single processing thread. Alternatively, method 200 may be performed by two or more processing threads, each thread executing one or more individual functions, routines, subroutines, or operations of the method. In certain implementations, the processing threads implementing method 200 may be synchronized (e.g., using semaphores, critical sections, and/or other thread synchronization mechanisms).

At block 210, the processing device implementing the method may initialize the trace matrix for storing various combinations of all requisite degrees of the sample points, the classifier matrix for storing the associated metadata, and the accumulator matrix representing the intermediate result to be updated at each iteration of the method. The trace matrix and the classifier matrix may be initialized by empty matrices (e.g., containing zero rows and columns). The elements of the accumulator matrix may be initialized with zero values.

At block 220, the processing device may receive the input dataset, which may represent a plurality of observed values of one or more variables. The input dataset may include multiple newly acquired traces (e.g., side channel response traces), and each trace may in turn include multiple sample points.

At block 230, the processing device may append, to the trace matrix, a plurality of rows reflecting the newly acquired traces. The trace matrix may include m rows and (n*p+1) columns, m is the number of traces, n is the number of sample points in each trace, and p is the maximum requisite degree corresponding to the ordinal number of the highest statistical moment to be computed. Each row of the trace matrix may be represented by a vector including an element equal to one and also including p sequences of elements, such each sequence includes n elements representing a corresponding degree of all sample points, and the sequences can appear in any order. Similarly, rows of the trace matrix (representing the respective traces) may appear in any order. Furthermore, in certain implementations, the trace matrix may contain additional rows and/or columns carrying some auxiliary or other related data, in which case the trace matrix would contain (m+q) rows and (n*p+r) columns, where q and (r−1) represent the numbers or rows and columns carrying the auxiliary or other related data.

At block 240, the processing device may append, to the transformed (e.g., transposed and/or rotated) classifier matrix, a plurality of columns representing metadata associated with the plurality of the newly acquired traces. In an illustrative example, the classifier matrix C may be represented by a binary matrix, in which every row reflects the input data being processed by the device under test, such that processing of the input data produced a corresponding side channel response trace. In another illustrative example, the classifier matrix C may be represented by a binary matrix, in which every row reflects an intermediate state of the device under test, such that processing of the input data produced the intermediate state of the data processing device, thus triggering a corresponding side channel response trace. The transformed classifier matrix C may contain k+1 rows and m columns, where m represents the number of side channel response traces stored in the trace matrix X, and k represents the size of the metadata vector associated with each trace. Each column of the transformed classifier matrix C may be represented by a vector including an element equal to one and further including k metadata elements associated with the corresponding side channel response trace. Accordingly, the order of columns of the transformed classifier matrix C should correspond to the order of rows in the associated trace matrix X.

At block 250, the processing device may update the accumulator matrix A with the data reflecting the newly acquired traces, by adding, to the accumulator matrix A, a product of the trace matrix X and the transformed classifier matrix C:

$$A=A+C*X \quad (16)$$

Alternatively, taking into account that C is the transposed classifier matrix and denoting the original matrix as C':

$$A=A+X'*C' \quad (16')$$

In certain implementations, the matrix computations may be performed using specialized computational software packages, such as Basic Linear Algebra Subprograms (BLAS).

At block 260, the processing device may utilize the accumulator matrix A for computing the requisite raw moments with using the equations (14)-(15), as explained in more detail herein above. In an illustrative example, the processing device may compute a statistical moment for the first portion of the input traces, such that the first portion of the input traces is identified by the first subset of elements of the classifier matrix corresponding to the first classifier value (e.g., 1). By design, a designated row (e.g., the first row) of the accumulator matrix stores all requisite degrees of sample points summed over all input traces; each of the remaining rows of the accumulator matrix stores all requisite degrees of sample points summed over a first portion of traces, for which the corresponding row of the transformed classifier matrix stores the values of the first classifier value (e.g., 1). Accordingly, as shown by the equations (14)-(15) and described herein above, computing a statistical moment for the first portion of the input traces may be performed using the first subset of elements of the accumulator matrix, which includes the elements of a certain row (e.g., the second row) of the accumulator matrix, which stores all requisite degrees of sample points summed over the first portion of the input traces identified by the first subset of elements of the classifier matrix corresponding to the first classifier value (e.g., 1). If a transposed accumulator matrix is utilized, the sums would be stored by a designated column of the transposed accumulator matrix. The computation may further involve dividing the selected elements of the accumulator matrix by the number of traces, which may be found in a designated column of the accumulator matrix (e.g., the first column).

The processing device may further compute the statistical moment for the second portion of the input traces, such that the second portion of the input traces is identified by the second subset of elements of the classifier matrix corresponding to the inverse of the first classifier value (e.g., 1). The requisite degrees of sample points summed over the second portion of the input traces may be computed by subtracting elements of the first subset of elements of the accumulator matrix from a corresponding sum of elements stored by the designated row (e.g., the first row) of the accumulator matrix.

Accordingly, as shown by the equations (14)-(15), computing the first statistical moment for the second portion of the input traces involves dividing the elements calculated in the previous step by the number of those traces. This number may be found by subtracting a value of the designated column from the total number of traces. In certain implementations, transposing the accumulator matrix would require using the sums stored by a designated column (e.g., the first column), rather than row, of the accumulator matrix.

Computing the second and higher statistical moments may be performed in a similar manner for any partitioning defined by the classifier matrix. For example, in order to calculate the t-test for the second statistical moment, the second and fourth statistical moments may be computed by applying the operations described herein above with respect to blocks 260 to the traces matrix X comprising the trace powers up to and including the fourth degree.

In an illustrative example, the processing device may compute the second statistical moment for the first portion of the input traces, such that the first portion of the input traces is identified by the first subset of elements of the classifier matrix corresponding to the first classifier value (e.g., 1). Accordingly, as shown by the equations (14)-(15) and described herein above, computing the second statistical moment for the first portion of the input traces may be performed using the first subset of elements of the accumulator matrix and the second subset of elements of the accumulator matrix, such that the union of the two subsets of the accumulator matrix includes the elements of a certain row (e.g., the second row) of the accumulator matrix, which stores all requisite degrees of sample points summed over the first portion of the input traces identified by the first subset of elements of the classifier matrix and the second subset of elements of the classifier matrix corresponding to the first classifier value (e.g., 1).

The processing device may further compute the second statistical moment for the second portion of the input traces, such that the second portion of the input traces is identified by the second subset of elements of the classifier matrix corresponding to the inverse of the first classifier value (e.g., 1). The requisite degrees of sample points summed over the second portion of the input traces may be computed by subtracting each element of the first subset of elements of the accumulator matrix and the second subset of elements of the accumulator matrix from a corresponding sum of elements stored by the designated row (e.g., the first row) of the accumulator matrix.

Higher order statistical moments may be computed in a similar manner.

At block 270, the processing device may utilize the computed values of raw moments for computing the requisite $1^{st}$ and higher order statistical univariate moments based on their respective definitions. Central moments, which may be utilized for t-test computations, may be derived from respective raw moments using the equations (5)-(7), as explained in more detail herein above. For example, in order to calculate the second statistical moment, the operations described in (6) should be applied to the traces matrix X comprising the trace powers up to and including the fourth degree. Computing the statistical moments may be performed in a similar manner for any partitioning defined by the classifier matrix.

At block 280, the processing device may utilize the statistical moments which have been calculated at block 270 for computing the Student's or Welch's t-test value, as described in more detail herein above.

Responsive to determining, at block 290, that a terminating condition has been met, the method may terminate at block 295; otherwise, the method may loop back to block 220. In an illustrative example, the terminating condition may evaluate the availability of new traces added to the input dataset: in the absence of new data, the method may terminate. In another illustrative example, the terminating condition may compare the t-test value computed at block 280 to a threshold value.

As noted herein above, the statistical moment computation methods described herein may be utilized for the statistical analysis of the acquired side channel responses of a target cryptographic data processing device. In certain implementations, the device vulnerability evaluation method may utilize two input datasets $D_0$ and $D_1$ or specify the respective dataset generation procedures. The device vulnerability evaluation method may iteratively draw randomly selected data blocks of a pre-defined size from the two input datasets, process the data blocks by the device being evaluated while recording in the matrix X the side-channel response (e.g., the power consumption and/or the electromagnetic emission) of the device. Respective metadata representing the input dataset is converted to the binary form and stored in the binary matrix C, which determines ways of sorting the collected traces. Accordingly, the device vulnerability evaluation method may update the accumulator matrix $A=A+C*X$, derive the requisite statistical moments from the accumulator matrix, and utilize the computed statistical moments to compute the Welch's or Student's t-test values between the two subsets of the trace dataset X, which is split according to the binary metadata, as described in more detail herein below with reference to FIG. 3. The method may terminate when all the input data has been processed or when a significant leakage has been found (e.g., the t-test value of some samples exceeds a pre-defined threshold, e.g., the value of 4.5).

Figure 3:
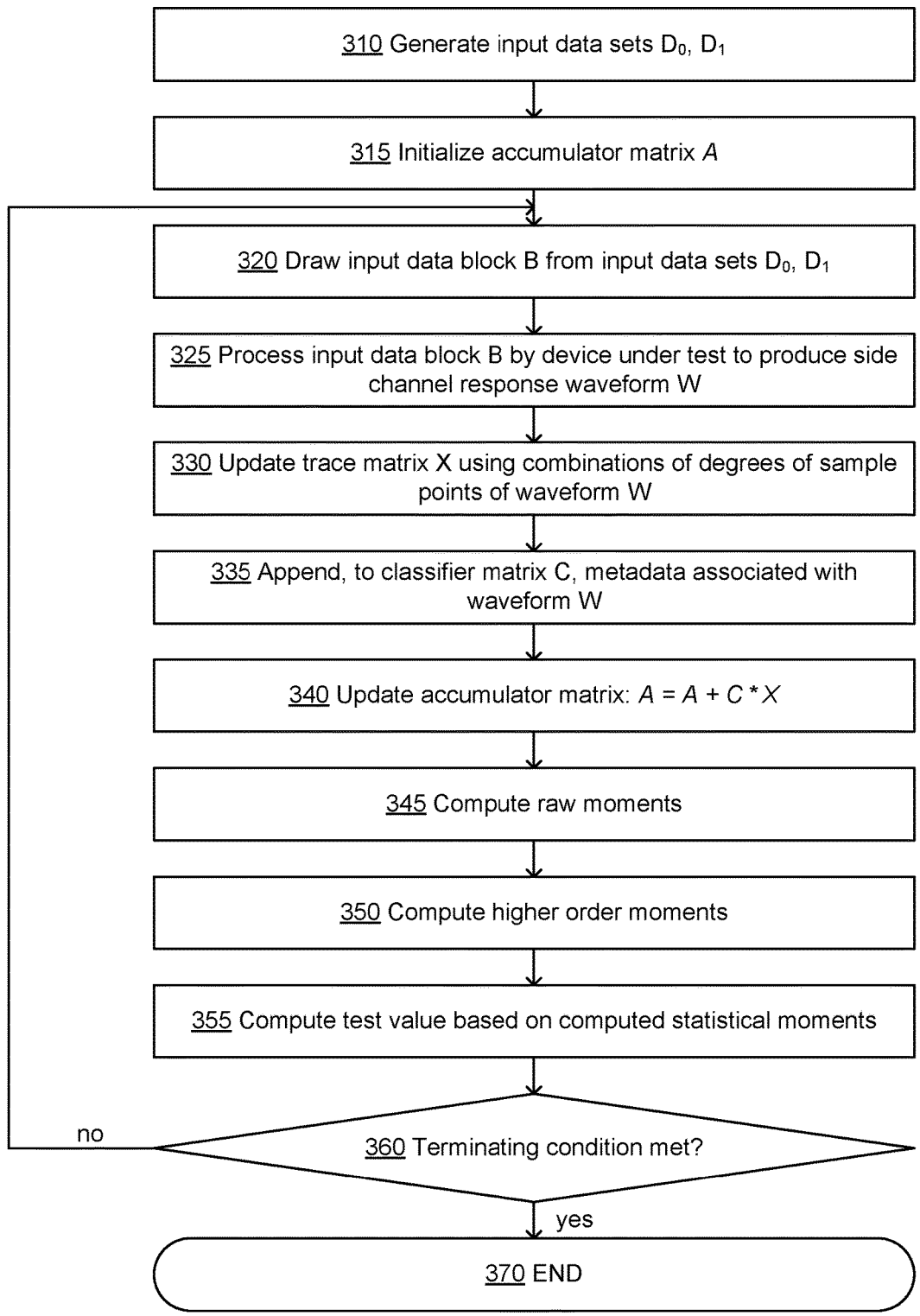
FIG. 3 depicts a flow diagram of an example method of evaluating side channel attack vulnerability of a cryptographic data processing device, in accordance with one or more aspects of the present disclosure.

FIG. 3 depicts a flow diagram of method 300 of evaluating side channel attack vulnerability of a cryptographic data processing device, in accordance with one or more aspects of the present disclosure. Method 300 and/or each of its individual functions, routines, subroutines, or operations may be performed by one or more general purpose or specialized processing devices of a computer system (e.g., example computer system 1000 of FIG. 3). In certain implementations, method 300 may at least partially be performed by specialized hardware accelerator circuitry implementing one or more operations of method 300.

In certain implementations, method 300 may be performed by a single processing thread. Alternatively, method 300 may be performed by two or more processing threads, each thread executing one or more individual functions, routines, subroutines, or operations of the method. In certain implementations, the processing threads implementing method 300 may be synchronized (e.g., using semaphores, critical sections, and/or other thread synchronization mechanisms).

At block 310, the processing device may generate two input datasets $D_0$ and $D_1$. In an illustrative example, each input dataset may include a combination of a randomly generated input data and fixed (pre-defined) input data.

At block 315, the processing device implementing the method may initialize the trace matrix X for storing various combinations of all requisite degrees of the sample points, the classifier matrix C for storing the associated metadata, and the accumulator matrix A representing the intermediate results to be updated at each iteration of the method. The trace and classifier matrices may be initialized by empty matrices (e.g., containing zero rows and columns). The elements of the accumulator matrix may be initialized with zero values.

At block 320, the processing device may randomly draw, from the datasets $D_0$ and $D_1$, a data block B of a pre-defined size.

At block 325, the processing device may process the input data block B by the device under test while recording the side-channel response (e.g., the power consumption, the electromagnetic emission, the sound emission, and/or the heat emission) of the device, thus producing a waveform W corresponding to the data block.

At block 330, the processing device may append, to the trace matrix X, a plurality of rows reflecting the side-channel response waveform W, such that the trace matrix would contain various combinations of all requisite degrees of the sample points produced by digitizing the waveform. The trace matrix may contain m rows and (n*p+1) columns, where m is the number of traces representing the digitized waveform, n is the number of sample points in each trace, and p is the maximum requisite degree corresponding to the ordinal number of the highest statistical moment to be computed. Each row of the trace matrix may be represented by a vector including an element equal to one and also including p sequences of elements, such each sequence includes n elements representing a corresponding degree of all sample points, and the sequences can appear in any order. Similarly, rows of the trace matrix (representing the respective traces) may appear in any order. Furthermore, in certain implementations, the trace matrix may contain additional rows and/or columns carrying some auxiliary or other related data, in which case the trace matrix would contain (m+q) rows and (n*p+r) columns, where q and (r−1) represent the numbers or rows and columns carrying the auxiliary or other related data.

At block 335, the processing device may append, to the transformed (e.g., transposed and/or rotated) classifier matrix C, a plurality of columns representing metadata associated with the plurality of the newly acquired traces. In an illustrative example, the classifier matrix C may be represented by a binary matrix, in which every row reflects the input data being processed by the device under test, such that processing of the input data produced the recorded side channel response trace. In another illustrative example, the classifier matrix C may be represented by a binary matrix, in which every row reflects an intermediate state of the device under test, such that processing of the input data triggered the intermediate state of the data processing device, thus producing the recorded side channel response trace. The transformed classifier matrix C may contain k+1 rows and m columns, where m represents the number of side channel response traces stored in the trace matrix X, and k represents the size of the metadata vector associated with each trace. Each column of the transformed classifier matrix C may be represented by a vector including an element equal to one and further including k metadata elements associated with the corresponding side channel response trace. Accordingly, the order of columns of the transformed classifier matrix C should correspond to the order of rows in the associated trace matrix X.

At block 340, the processing device may update the accumulator matrix A with the data reflecting the newly acquired traces, by adding, to the accumulator matrix A, a product of the trace matrix X and the transformed classifier matrix C:

$$A = A + C*X \quad (17)$$

Alternatively, taking into account that C is the transposed classifier matrix and denoting the original matrix as C':

$$A = A + X'^{*}C' \quad (17')$$

At block 345, the processing device may utilize accumulator matrices A for computing the requisite raw moments using the equations (14)-(15), as explained in more detail herein above.

At block 350, the processing device may utilize the computed values of raw moments for computing the requisite higher-order statistical univariate moments based on their respective definitions. Central moments and variances, which may be utilized for t-test computations, may be derived from respective raw moments using the equations (5)-(7), as explained in more detail herein above.

At block 355, the processing device may compute the Welch's or Student's t-test values based on the computed statistical moments:

$$t = (\mu_0 - \mu_1)/\sqrt{(s_0^2/m_0 + s_1^2/m_1)}$$

where $\mu_0$ and $\mu_1$ are the sample means of the first and second datasets (defined by the metadata in the binary form), respectively, represented by vectors having the same size as the processed waveforms, $s_0^2$ and $s_1^2$ are variances of the first and second datasets, respectively, and $m_0$ and $m_1$ are the number of sample traces in the first and second datasets, respectively.

Responsive to determining, at block 360, that the terminating condition has been met, the method may terminate at block 370; otherwise, the method may loop back to block 320. In an illustrative example, the terminating condition may evaluate the availability of data blocks in the input datasets: in the absence of new data, the method may terminate. In another illustrative example, the terminating condition may compare, to a threshold value, the t-test value computed at block 355. In an illustrative example, the t-test value exceeding a pre-defined threshold (e.g., the value of 3.5) may be indicative of the potential device vulnerability to side channel attacks.

Figure 4:
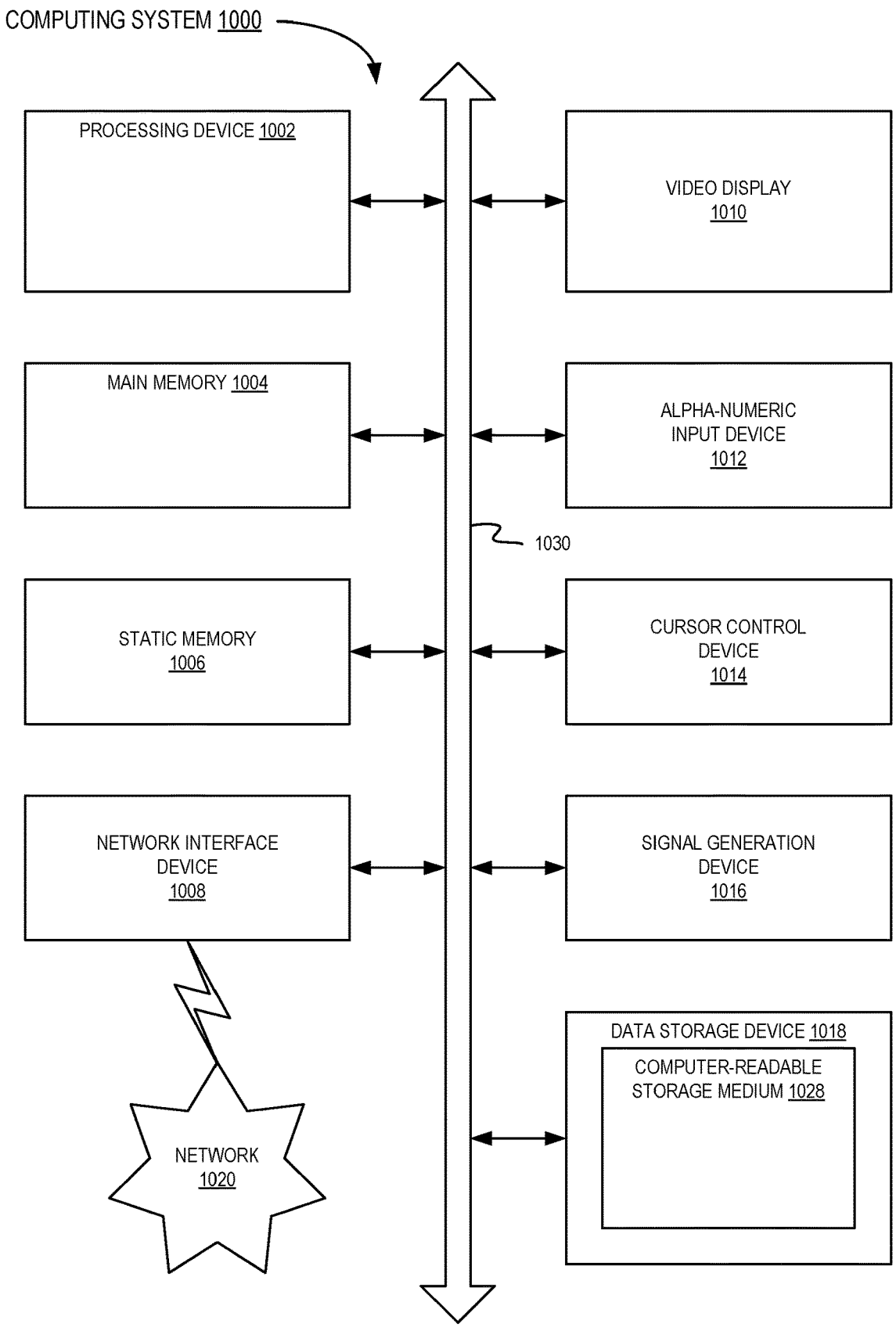
FIG. 4 illustrates a diagrammatic representation of an example computer system which may implement the methods described herein.

FIG. 4 illustrates a diagrammatic representation of a computer system 1000 which may implement the methods described herein. Computer system 1000 may be connected to other computer systems in a LAN, an intranet, an extranet, and/or the Internet. The computer system may operate in the capacity of a server machine in client-server network environment. The computer system may be provided by a personal computer (PC), a set-top box (STB), a server, a network router, switch or bridge, or any machine capable of executing a set of instructions (sequential or otherwise) that specify actions to be taken by that machine. Further, while only a single computer system is illustrated, the term "computer system" shall also be taken to include any collection of computer systems that individually or jointly execute a set (or multiple sets) of instructions to perform the methods described herein.

The example computer system 1000 may include a processing device 1002, which in various illustrative examples may be a general purpose or specialized processor comprising one or more processing cores. The example computer system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The example computer system 1000 may further include a network interface device 1008 which may communicate with a network 1020. The example computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions implementing any one or more of the methods or functions described herein. The instructions may also reside, completely or at least partially, within the main memory 1004 and/or within the processing device 1002 during execution thereof by the example computer system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving a plurality of input traces, wherein each trace of the plurality of input traces includes a plurality of sample points;
appending, to a trace matrix comprising combinations of pre-determined degrees of the sample points, a plurality of rows representing the plurality of input traces;
appending, to a classifier matrix, a plurality of columns representing metadata associated with the plurality of input traces;
applying a defined transformation to the classifier matrix to produce a transformed classifier matrix;
incrementing an accumulator matrix by a product of the transformed classifier matrix and the trace matrix;
computing, using a first subset of elements of the accumulator matrix, a first statistical moment for a first portion of the input traces identified by a first subset of elements of the classifier matrix, wherein the first subset of elements of the classifier matrix is identified by a first classifier value; and
computing, by subtracting each element of the first subset of elements of the accumulator matrix from a corresponding sum of elements of the input traces stored by the accumulator matrix, a second statistical moment for a second portion of the input traces identified by a second subset of elements of the classifier matrix, wherein the second subset of elements of the classifier matrix is identified by a second classifier value.

2. The method of claim 1, further comprising:
computing, using the first subset of elements of the accumulator matrix and a second subset of elements of the accumulator matrix, a third statistical moment for the first portion of input traces identified by the first subset of elements of the classifier matrix, wherein the first subset of elements of the classifier matrix is identified by the first classifier value; and
computing, by subtracting each element of the first subset of elements of the accumulator matrix and the second subset of elements of the accumulator matrix from a corresponding sum of elements of the input traces stored by the accumulator matrix, a fourth statistical moment for the second portion of the input traces identified by the second subset of elements of the classifier matrix, wherein the second subset of elements of the classifier matrix is identified by the second classifier value.

3. The method of claim 1, further comprising:
computing, based on the computed statistical moments, a test value.

4. The method of claim 1, further comprising:
utilizing the computed statistical moments for evaluating side channel attack vulnerability of a cryptographic data processing device.

5. The method of claim 1, wherein the trace matrix comprises m rows and (n*p+1) columns, wherein m represents a number of input traces, n represents a number of sample points in each trace, and p represents a maximum degree of the pre-determined degrees.

6. The method of claim 1, wherein each row of the trace matrix is represented by a vector comprising a plurality of sequences of elements, wherein each sequence of elements includes a plurality of elements representing a certain degree of the plurality of sample points.

7. The method of claim 1, wherein the metadata is represented by a plurality of binary values reflecting data being processed by a cryptographic data processing device, such that processing the data produces a corresponding side channel response trace.

8. The method of claim 1, wherein the metadata is represented by a plurality of binary values reflecting an internal state of a cryptographic data processing device.

9. The method of claim 1, further comprising:
iteratively repeating the receiving, appending, incrementing, and computing operations until a terminating condition has been met.

10. A non-transitory computer-readable storage medium having thereon executable instructions which, when executed by a processing device, cause the processing device to:

receive a plurality of input traces, wherein each trace of the plurality of input traces includes a plurality of sample points;

append, to a trace matrix comprising combinations of pre-determined degrees of the sample points, a plurality of rows representing the plurality of input traces;

append, to a classifier matrix, a plurality of columns representing metadata associated with the plurality of input traces;

apply a defined transformation to the classifier matrix to produce a transformed classifier matrix;

increment an accumulator matrix by a product of the transformed classifier matrix and the trace matrix;

compute, using a first subset of elements of the accumulator matrix, a first statistical moment for a first portion of the input traces identified by a first subset of elements of the classifier matrix, wherein the first subset of elements of the classifier matrix is identified by a first classifier value; and compute, by subtracting each element of the first subset of elements of the accumulator matrix from a corresponding sum of elements of the input traces stored by the accumulator matrix, a second statistical moment for a second portion of the input traces identified by a second subset of elements of the classifier matrix, wherein the second subset of elements of the classifier matrix is identified by a second classifier value.

11. The non-transitory computer-readable storage medium of claim 10, further comprising executable instructions causing the processing device to:

compute, using the first subset of elements of the accumulator matrix and a second subset of elements of the accumulator matrix, a third statistical moment for the first portion of input traces identified by the first subset of elements of the classifier matrix, wherein the first subset of elements of the classifier matrix is identified by the first classifier value; and compute, by subtracting each element of the first subset of elements of the accumulator matrix and the second subset of elements of the accumulator matrix from a corresponding sum of elements of the input traces stored by the accumulator matrix, a fourth statistical moment for the second portion of the input traces identified by the second subset of elements of the classifier matrix, wherein the second subset of elements of the classifier matrix is identified by the second classifier value.

12. The non-transitory computer-readable storage medium of claim 10, further comprising executable instructions causing the processing device to:

compute, based on the computed statistical moments, a test value.

13. The non-transitory computer-readable storage medium of claim 10, further comprising executable instructions causing the processing device to:

utilize the computed statistical moments for evaluating side channel attack vulnerability of a cryptographic data processing device.

14. The non-transitory computer-readable storage medium of claim 10, wherein each row of the trace matrix is represented by a vector comprising a plurality of sequences of elements, wherein each sequence of elements includes a plurality of elements representing a certain degree of the plurality of sample points.

15. The non-transitory computer-readable storage medium of claim 10, wherein each metadata vector is represented by a plurality of binary values reflecting data being processed by a cryptographic data processing device, such that processing the data produces a corresponding side channel response trace.

16. The non-transitory computer-readable storage medium of claim 10, wherein each metadata vector is represented by a plurality of binary values reflecting an internal state of a cryptographic data processing device.

17. The non-transitory computer-readable storage medium of claim 10, further comprising executable instructions causing the processing device to:

iteratively repeat the receiving, appending, incrementing, and computing operations until a terminating condition has been met.

18. A method, comprising:

drawing a randomly selected data block from a pair of input datasets;

recording a side channel response of a cryptographic data processing device processing the data block, the side channel response including a plurality of input traces, wherein each trace of the plurality of input traces includes a plurality of sample points;

appending, to a trace matrix comprising combinations of pre-determined degrees of sample points, a plurality of rows representing the plurality of input traces;

appending, to a classifier matrix, a plurality of columns representing metadata associated with the plurality of input traces;

applying a defined transformation to the classifier matrix to produce a transformed classifier matrix;

adding, to an accumulator matrix, a product of the transformed classifier matrix and the trace matrix;

computing, using a first subset of elements of the accumulator matrix, a first statistical moment for a first portion of the input traces identified by a first subset of elements of the classifier matrix, wherein the first subset of elements of the classifier matrix is identified by a first classifier value;

computing, by subtracting each element of the first subset of elements of the accumulator matrix from a corresponding sum of elements of the input traces stored by the accumulator matrix, a second statistical moment for a second portion of the input traces identified by a second subset of elements of the classifier matrix, wherein the second subset of elements of the classifier matrix is identified by a second classifier value; and computing, based on the computed statistical moments, a test value.

19. The method of claim 18, further comprising:

computing, using the first subset of elements of the accumulator matrix and a second subset of elements of the accumulator matrix, a third statistical moment for the first portion of input traces identified by the first subset of elements of the classifier matrix, wherein the first subset of elements of the classifier matrix is identified by the first classifier value; and computing, by subtracting each element of the first subset of elements of the accumulator matrix and the second subset of elements of the accumulator matrix from a corresponding sum of elements of the input traces stored by the accumulator matrix, a fourth statistical moment for the second portion of the input traces identified by the second subset of elements of the classifier matrix, wherein the second subset of elements of the classifier matrix is identified by the second classifier value.

20. The method of claim 18, further comprising:

utilizing the computed test value for evaluating side channel attack vulnerability of a cryptographic data processing device.

21. The method of claim 18, further comprising:

iteratively repeating the receiving, appending, incrementing, and computing operations until a terminating condition has been met.

22. A non-transitory computer-readable storage medium having thereon executable instructions which, when executed by a processing device, cause the processing device to:

draw a randomly selected data block from a pair of input datasets;

record a side channel response of a cryptographic data processing device processing the data block, the side channel response including a plurality of input traces, wherein each trace of the plurality of input traces includes a plurality of sample points;

append, to a trace matrix comprising combinations of pre-determined degrees of sample points, a plurality of rows representing the plurality of input traces;

append, to a classifier matrix, a plurality of columns representing metadata associated with the plurality of input traces;

apply a defined transformation to the classifier matrix to produce a transformed classifier matrix;

add, to an accumulator matrix, a product of the transformed classifier matrix and the trace matrix;

compute, using a first subset of elements of the accumulator matrix, a first statistical moment for a first portion of the input traces identified by a first subset of elements of the classifier matrix, wherein the first subset of elements of the classifier matrix is identified by a first classifier value;

compute, by subtracting each element of the first subset of elements of the accumulator matrix from a corresponding sum of elements of the input traces stored by the accumulator matrix, a second statistical moment for a second portion of the input traces identified by a second subset of elements of the classifier matrix, wherein the second subset of elements of the classifier matrix is identified by a second classifier value; and compute, based on the computed statistical moments, a test value.

23. The non-transitory computer-readable storage medium of claim 22, further comprising executable instructions causing the processing device to:

utilizing the computed test value for evaluating side channel attack vulnerability of a cryptographic data processing device.

24. The non-transitory computer-readable storage medium of claim 22, further comprising executable instructions causing the processing device to:

computing, using the first subset of elements of the accumulator matrix and a second subset of elements of the accumulator matrix, a third statistical moment for the first portion of input traces identified by the first subset of elements of the classifier matrix, wherein the first subset of elements of the classifier matrix is identified by the first classifier value; and computing, by subtracting each element of the first subset of elements of the accumulator matrix and the second subset of elements of the accumulator matrix from a corresponding sum of elements of the input traces stored by the accumulator matrix, a fourth statistical moment for the second portion of the input traces identified by the second subset of elements of the classifier matrix, wherein the second subset of elements of the classifier matrix is identified by the second classifier value.

25. The non-transitory computer-readable storage medium of claim 22, further comprising executable instructions causing the processing device to:

iteratively repeating the receiving, appending, incrementing, and computing operations until a terminating condition has been met.

* * * * *